United States Patent
Chen

(10) Patent No.: US 7,469,793 B2
(45) Date of Patent: Dec. 30, 2008

(54) RACK WITH LINEAR GUIDE

(75) Inventor: Hsin-Yueh Chen, Chang Hua Hsien (TW)

(73) Assignee: I Jang Industrial Co., Ltd., Pei Tou Hsiang, Chang Hua Hsien (TW)

( * ) Notice: Subject to any disclaimer, the term of this patent is extended or adjusted under 35 U.S.C. 154(b) by 342 days.

(21) Appl. No.: 11/387,640

(22) Filed: Mar. 24, 2006

(65) Prior Publication Data

US 2007/0144992 A1 Jun. 28, 2007

Related U.S. Application Data

(63) Continuation-in-part of application No. 10/948,482, filed on Sep. 21, 2004, now Pat. No. 7,124,902.

(51) Int. Cl.
*A47F 5/00* (2006.01)

(52) U.S. Cl. .................................................. 211/162

(58) Field of Classification Search ............ 211/126.15, 211/151, 162, 189, 1.51, 1.57, 121, 122; 312/198–201; 193/35 R, 35 A, 37
See application file for complete search history.

(56) References Cited

U.S. PATENT DOCUMENTS

| | | | | | |
|---|---|---|---|---|---|
| 1,601,988 | A | * | 10/1926 | Vanderveld | 312/133 |
| 2,166,704 | A | * | 7/1939 | Foulkes | 312/199 |
| 2,812,069 | A | * | 11/1957 | Trammell | 211/162 |
| 4,417,524 | A | * | 11/1983 | Quinn et al. | 105/101 |
| 4,624,510 | A | * | 11/1986 | Jedziniak | 312/223.3 |
| 4,738,369 | A | * | 4/1988 | Desjardins | 211/113 |
| 4,913,298 | A | * | 4/1990 | Compagnucci | 211/162 |
| 5,938,047 | A | * | 8/1999 | Ellis et al. | 211/1.57 |
| 7,124,902 | B1 | * | 10/2006 | Chen | 211/162 |
| 2004/0256339 | A1 | * | 12/2004 | Welsch et al. | 211/162 |

\* cited by examiner

*Primary Examiner*—Jennifer E. Novosad
(74) *Attorney, Agent, or Firm*—Egbert Law Offices PLLC

(57) ABSTRACT

A rack has a linear guide and a braking module. The braking module has a braking device, a braking block, a transmission shaft and a elastic device. A central end of the braking device expands toward one side of a slide rest so as to allow the control end to extend outwardly of the slide rest. The transmission shaft drives the braking block. The braking block touches the rails so as to achieve a braking effect.

5 Claims, 5 Drawing Sheets

RACK WITH LINEAR GUIDE

RELATED U.S. APPLICATIONS

The present application is a continuation-in-part of U.S. application Ser. No. 10/948,482, filed on 21 Sep. 2004 now U.S. Pat. No. 7,124,902, and entitled "RACK WITH LINEAR GUIDE".

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a rack, and more particularly to a rack which linear guide allows for linear movement.

BACKGROUND OF THE INVENTION

Generally, a rack is to be fixed at a certain place to hold and store articles. However, in some special locations, such as supermarkets and storehouses, the size and number of racks are too big, and any relocation and sorting of articles requires a large amount of time and labor, resulting in a waste of time and labor force as well as increasing costs. Consequently, this kind of fixed rack is not desirable.

Based on this notion, the inventor has provided the present invention of "RACK WITH LINEAR GUIDE" as a continuation-in-part of the invention described in a co-pending parent patent application. After development of the invention of the parent patent, the inventor still seeks a better and more practical structure. The inventor found that a braking module disclosed in the original case can adapt another structure besides the structure defined in the original case to achieve the effect of a rack with linear guide; therefore, it is defined herein.

BRIEF SUMMARY OF THE INVENTION

The present invention mainly modifies part of the structure described in the parent application. The braking module A comprises braking device 50, braking block 60, transmission shaft 70 and elastic device 80. First, it uses the configuration that the control end 51 of the braking device 50 expands towards one side of the slide rest 20 to make the control end exposed to the external side of the rack 10 (as shown in FIG. 1), making it more convenient to control.

Next, the present invention uses the transmission shaft 70 to drive the braking block 60, and uses the transmission shaft 70 to move stably inside the internal base 90 for durability. Moreover, it uses the feature of the braking block 60 touching the rails 30 to achieve the braking effect and to achieve a more forceful braking effect than the invention of the parent application.

The above is a detailed description of the technical features of this invention. Any adjustment and revision of this invention should be subject to the invention and within the scope prescribed by the patent.

DETAILED DESCRIPTION OF THE INVENTION

Figure 1:
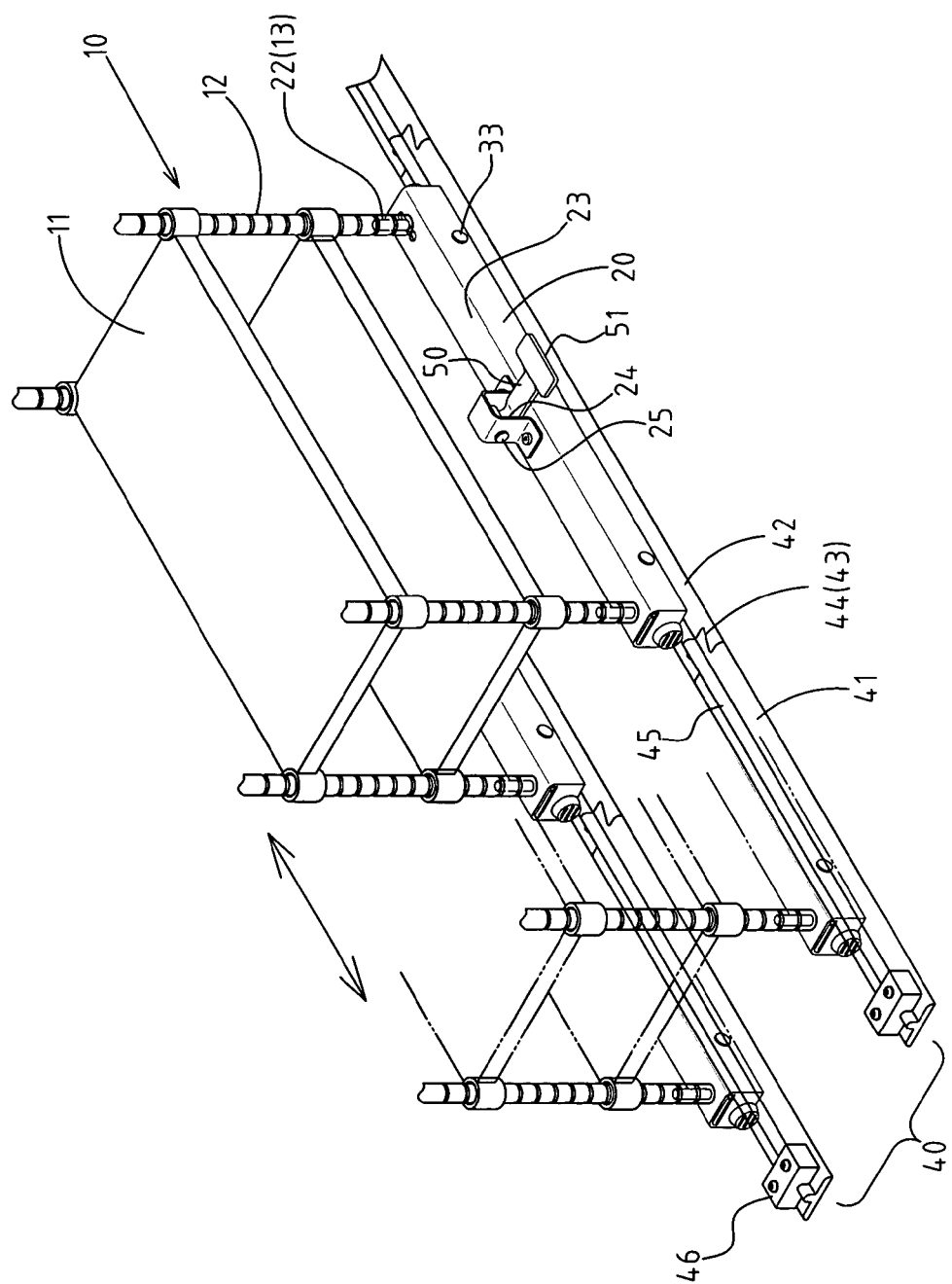
FIG. 1 shows a perspective view of the preferred embodiment of the present invention.
Figure 2:
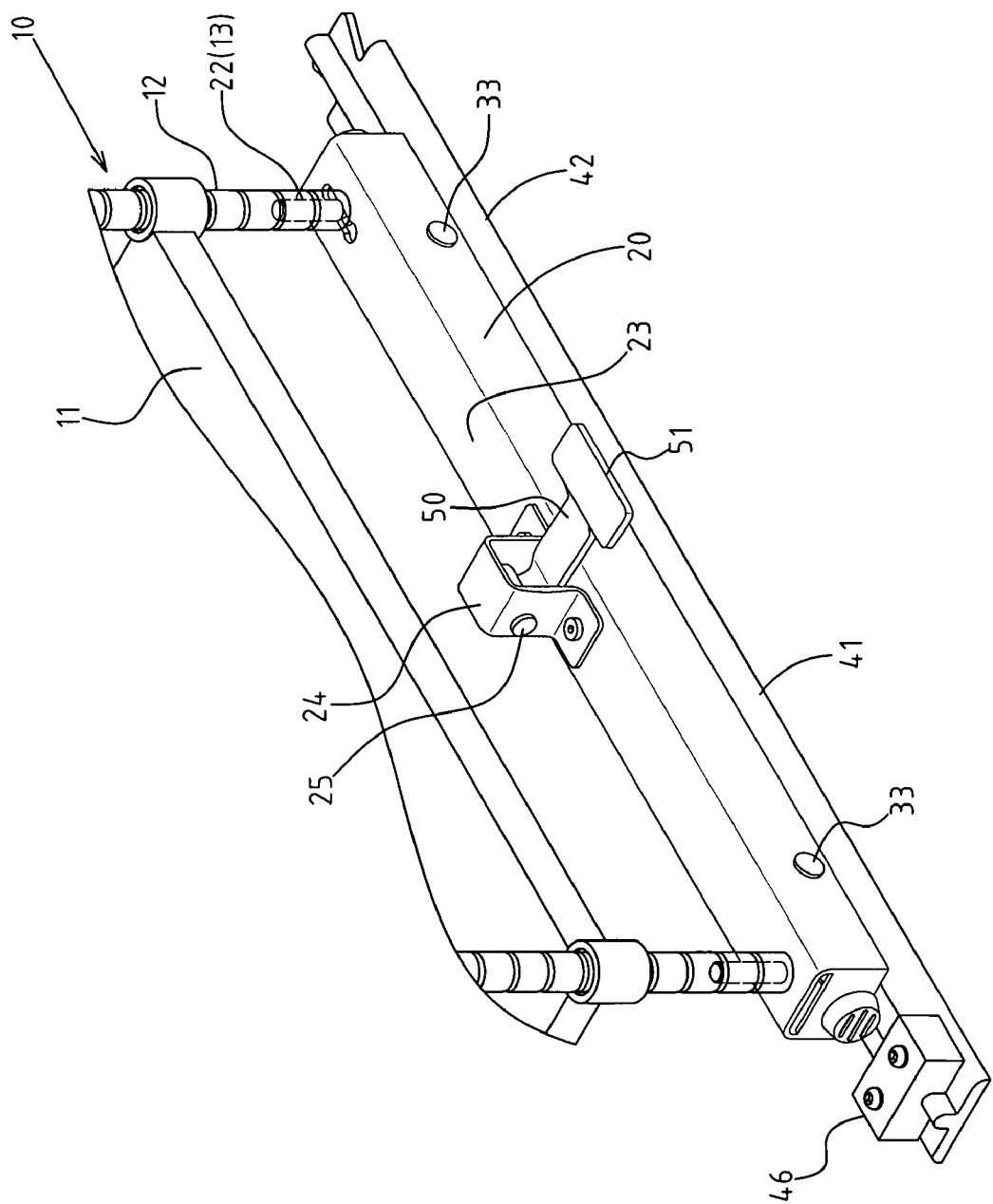
FIG. 2 shows a perspective view of the partial structure of the invention.
Figure 3:
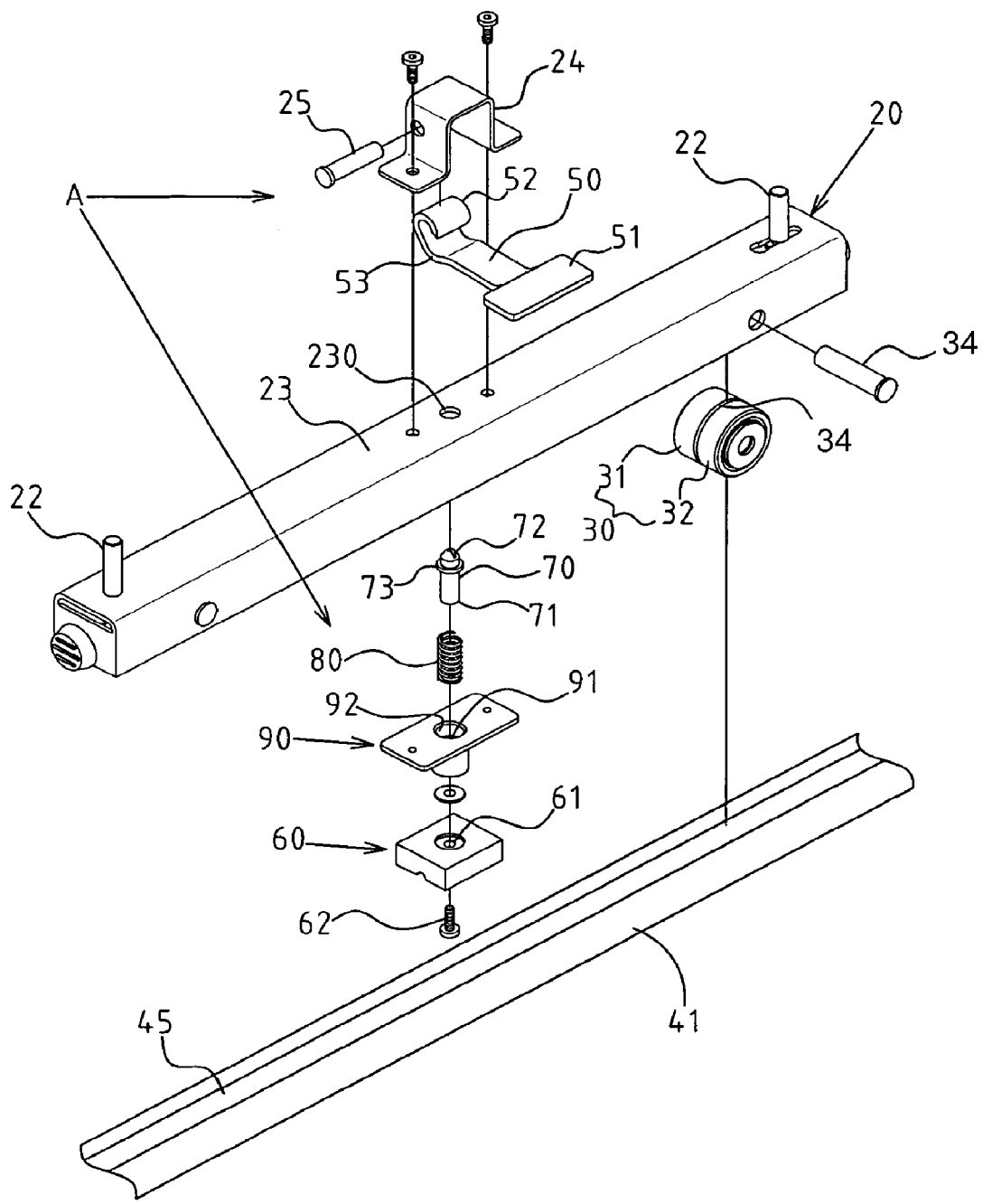
FIG. 3 shows an exploded perspective view of the partial structure of the invention.

The features and the advantages of the present invention will be more readily understood upon a thoughtful deliberation of the following detailed description of a preferred embodiment of the present invention with reference to the accompanying drawings.

As shown in FIGS. 1-4, a rack with linear guide embodies the present invention.

A rack body 10 is composed of several shelves 11 and stings 12 of several directions (in this case, there are four directions). There are pre-set plugholes 13 at the end of each sting 12.

Slide rests 20 are divided into two groups and set at the ends of the two stings 12 of the rack body 10. This ⊓-type slide rest is made of a metal plate and has a rut 21. At both ends of the slide rest 20, there are standing columns 22 to fit into the pre-set plugholes 13 at the end of each sting 12 of the rack body 21.

A compartmental roller 30 is fixed at the both ends of the rut 21 of the slide rest 20 by horizontal axis hitch 33. This compartmental roller 30 can be divided into left roller 31 and right roller 32, between which there is a compartmental rut 34. The bottom edges of the left and right rollers 31 32 are both bulging from the slide rest 20.

The invention includes two parallel sliding tracks 40, each being composed of several independent sliding rails 41 42 which are connected and fixed (via bolts) on the floor at the position of the rack 10 to bear the two slide rests 20. The rails 41 42 can be connected by flange 44 and concave rim 43. The section of the rail is convex, in the middle of which there is a convex edge 45 (see FIG. 4 for details). This convex edge 45 can fit into the compartmental rut 33 between the left and right rollers 31 32 and form a linear guide (see FIG. 3 for details).

A blocker 46 is fixed at the end of the rail 41 to stop slide rest 20 and keep the rack 10 on the rail 40.

Braking module A is fixed at the slide rest 20, and it comprises a braking device 50, a braking block 60, a transmission shaft 70 and an elastic device 80. Among them, the braking device 50 is fixed on the top surface 23 of the slide rest 20, and it comprises a control end 51 and a braking end 52. The braking end 52 is positioned pivotally, so that the control end 51 can use braking end 52 as a spinning point to oscillate up and down. The braking end 52 forms a curve section 53, and the control end 51 extends towards one side of the slide rest 20. The control end 51 of this embodiment is expanded like a "T" shape for human feet to step on. The braking block 60 is fixed at the bottom of the slide rest 20, so that the bottom of the braking block 60 can touch the rail 41 or 42. The transmission shaft 70 is placed inside the slide rest 20, and can be slid up and down in a limiting position. The bottom of the transmission shaft 70 is connected to the braking block 60, and the top 72 extends out to the top surface of the slide rest 20 and corresponds to the curve section of the braking device 50. The elastic device 80 can be restored upward by the transmission shaft 70.

Among them, the braking device 50 can be a bendable metal plate.

Among them, a U-shaped rest 24 can be placed on the top surface of the slide rest 20, and a cross axle 25 can be placed on the U-shaped rest 24 for the braking end 52 of the braking device 50 to position pivotally.

Among them, an internal base 90 can be placed inside the slide rest 20 for the transmission shaft 70, and a penetrating hole 91 can be placed inside the internal base 90 for the transmission shaft 70 to slide inside. The top of the penetrating hole 91 corresponds to a penetrating hole 230 at the top surface 23 of the slide rest 20. The penetrating hole 91 has an expanding section 92 for the top of the transmission shaft 70 to set a flange 73. The transmission shaft 70 is limited inside the expanding section 92, which limits the transmission shaft 70 sliding up and down. The elastic device 80 mentioned herein can be placed between the flange 73 of the transmission shaft 70 and a blocking edge at the bottom of the penetrating hole 91.

Among them, a screw hole 74 and a penetrating hole 61 may be placed at the bottom of the transmission shaft 70 and the braking block 60. A bolt 62 for the penetrating hole 61 of the braking block 60 is used to tighten the screw hole 74 of the transmission shaft 70, and to position the braking block and transmission shaft.

Through the above structure and design, the operation of the braking module 50 disclosed by the present invention is explained.

Because the braking module A disclosed in the present invention is fixed at the slide rest 20 of the rack, the operation of the braking module A can be stepping or picking it upward to control the control end 51 of the braking device 50 so that it is released in an upward angle, or braked in a downward angle.

Figure 4:
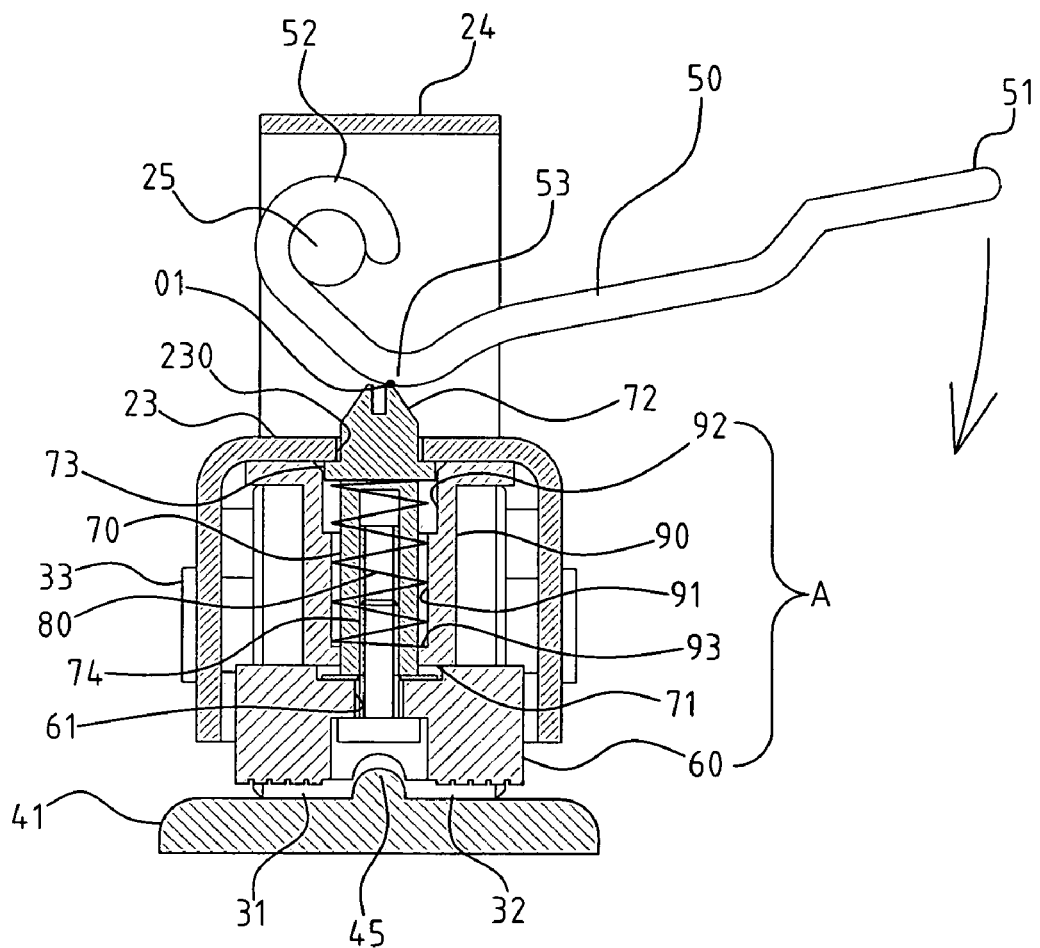
FIGS. 4-5 show lateral cross-sectional views of the movement of the braking component.

As shown in FIG. 4, when the control end 51 of the braking device 50 of the braking module A is oscillating upward, the transmission shaft 70 can be pushed upward by the elastic device 80 and make the top of the transmission shaft 70 correspond to the first position 01 of the curve section of the braking device 50. Under this condition, the space between the braking block 60 of the braking module A and the rails 41 is loose so as to make the rack 10 slide.

Figure 5:
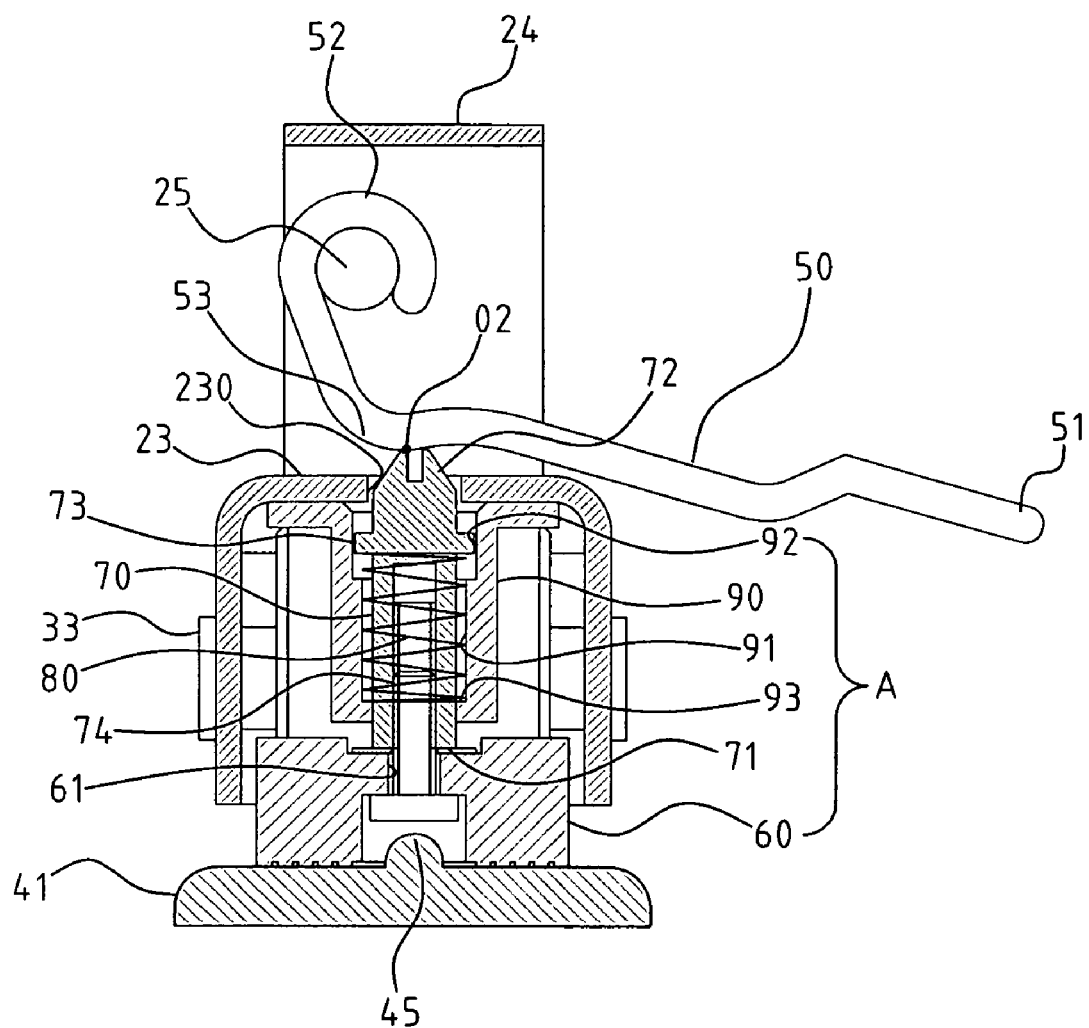

As shown in FIG. 5, when the control end 51 of the braking device 50 is forced downward to the limiting position, it causes the top 72 of the transmission shaft 70 to press down by the curve section 53 of the braking device 50. Corresponding to the second position 02 of the curve section 53, and under this condition, the braking block 60 of the braking module A descends and is pushed against the rail 41 because the transmission shaft 70 descends, securing the rack and at the same time pressing the elastic device 80 to accumulate elasticity. Therefore, when the control end 51 of the braking device 50 is restored upward, it can use the elasticity of the elastic device 80 to support the transmission shaft 70 upward and make the braking block 60 come off rails 41.

Through the above structure and design, the rack 10 disclosed in the present invention can be placed on the rails 30 through the slide rest 2 at the bottom and achieve the purpose of linear slide within a pre-determined length (as shown in FIG. 1). The braking module 50 is further used to control the sliding or positioning state of the rack 10.

I claim:

1. A rack apparatus comprising:
    a rack body having at least one shelf and a plurality of stings at corners of the shelf;
    said plurality of stings each having a plughole at an end thereof;
    a plurality of inverted U-shaped slide rests having a standing column at each end thereof, said standing column fitting into said plughole;
    a plurality of rollers rotatably mounted to the slide rests, each of said plurality of rollers having a left roller and a right roller, said left roller and said right roller having a compartmental rut therebetween, said left roller and said right roller each having a bottom edge extending outwardly of a bottom of the slide rests;
    a pair of parallel sliding tracks each formed of a plurality of separate sliding rails being connected together and fixed by bolts to an underlying surface, said pair of parallel sliding tracks respectively bearing the slide rests thereon, the rails being connected together by a flange and concave rim connector, the rail having a convex shape with a convex edge in a center thereof, said convex edge being received in said compartmental rut;
    a blocking means affixed at an end of the rail for stopping the slide rest so as to keep said rack body on the rails; and
    a braking module affixed to the slide rest, said braking module comprising:
        a braking device affixed on a top surface of the side rest, said braking device having a control end and a braking end, said braking end being pivotally positioned, said braking end being a spinning point for said control end so as to allow said control end to oscillate upwardly and downwardly, said braking end defining a curved section, said control end extending toward one side of the slide rest;
        a braking block affixed at a bottom of the slide rest such that a bottom of said braking block can touch the rail;
        a transmission shaft positioned inside the slide rest, said transmission shaft being slidable upwardly and downwardly, said transmission shaft having a bottom connected to said braking block, said transmission shaft having a top extending to said top surface of said slide rest so as to correspond to said curved section of said braking device; and
        an elastic device cooperative with said transmission shaft so as to be urged upwardly by said transmission shaft.

2. The rack apparatus of claim 1, further comprising:
    a U-shaped rest positioned on said top surface of slide rest; and
    a cross axle positioned on said U-shaped rest, said braking end of said braking device being pivotable on said cross axle.

3. The rack apparatus of claim 1, said transmission shaft having an internal base positioned in the slide rest, said internal base having a penetrating hole therein, said transmission shaft being slidable in said penetrating hole, the slide rest having another penetrating hole at said top surface thereof, said penetrating hole of said internal base having a top corresponding to said another penetrating hole of the slide rest, said penetrating hole of said internal base having an expanded section, said top of said transmission shaft having a flange received in said expanded section, said elastic device being positioned between said flange and a blocking edge at a bottom of said penetrating hole of said internal base.

4. The rack apparatus of claim 1, said braking block having a penetrating hole at a bottom thereof, said transmission shaft having a screw hole at a bottom thereof, said penetrating hole having a bolt engaged so as to tighten ins said screw hole.

5. The rack apparatus of claim 1, said transmission shaft being pushed upwardly by said elastic device when said control end of said braking device is oscillated upwardly, said top of said transmission shaft being urged downwardly by said curved section of said braking device when said control end of said braking device is forced downwardly.

* * * * *